Jan. 10, 1967  E. KALLAES  3,296,933
TOOL FOR EXTERNAL MACHINING OF WORKPIECES
Filed April 27, 1965  3 Sheets-Sheet 1

INVENTOR
ELIS KALLAES
BY
ATTORNEYS

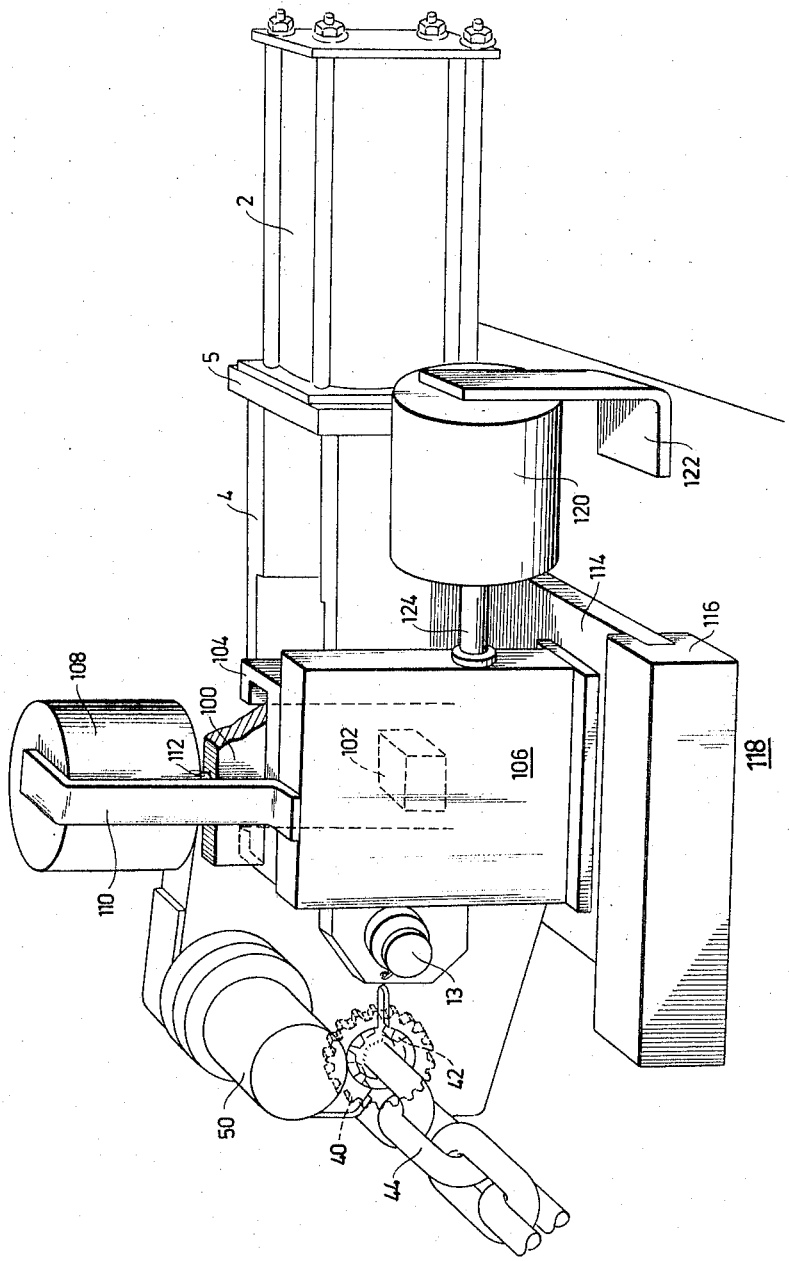

United States Patent Office 3,296,933
Patented Jan. 10, 1967

3,296,933
TOOL FOR EXTERNAL MACHINING
OF WORKPIECES
Elis Kallaes, Orsa, Sweden, assignor to Jarnbirger Aktiebolag, Orsa, Sweden, a Swedish company
Filed Apr. 27, 1965, Ser. No. 451,112
Claims priority, application Sweden, Apr. 27, 1964,
5,235/64
13 Claims. (Cl. 90—15)

The present invention relates to a tool for external machining of workpieces, for instance for removal of burrs and the like from tubular and rod-shaped material. The tool according to the invention is particularly useful for removing welding burrs formed on chain links in butt welding thereof.

The main object of the present invention is to provide a tool, by means of which excess material can be removed quickly and thoroughly, so that the material to be machined obtains a uniform thickness and a smooth surface without fracture indications.

According to the present invention, the tool comprises a workpiece holder for fixing the workpiece therein, an annular cutter holder adapted to embrace said workpiece, cutters extending inwardly from said cutter holder, driving means for rotating said cutter holder about its annular axis, and means for translationally moving one of said holders perpendicularly to the annular axis of said cutter holder relative to the other of said holders.

In a preferred embodiment of the invention said annular cutter holder is composed of at least two arc sections so as to be openable for insertion and removal of the workpiece. The tool may comprise a tool holder, said cutter holder being rotatably mounted in said tool holder, which is correspondingly openable.

The annular cutter holder may be mounted in sliding bearings in the tool holder and may be shaped as an externally cogged or toothed wheel.

In another preferred embodiment of the invention said tool holder comprises a pair of tongs, said annular cutter holder being mounted in the mouth of the tongs.

As stated above the tool is provided with means for displacing the axis of said annular holder relative to the workpiece. Said axis may be displaceable substantially rectilinearly in two directions forming an angle, preferably a substantially right angle, to each other. In another embodiment of the invention the tool comprises a tool holder, said annular cutter holder being rotatably mounted in said tool holder, an eccentric being associated with said tool holder so as to impart a circular movement to the axis of said annular cutter holder relative to the workpiece.

The invention will now be further explained by non-limiting examples of embodiments thereof with reference to the accompanying drawings.

In the drawings:

FIG. 3 is a perspective view of another embodiment of the invention comprising reciprocators for the translational movement.

Figure 1:
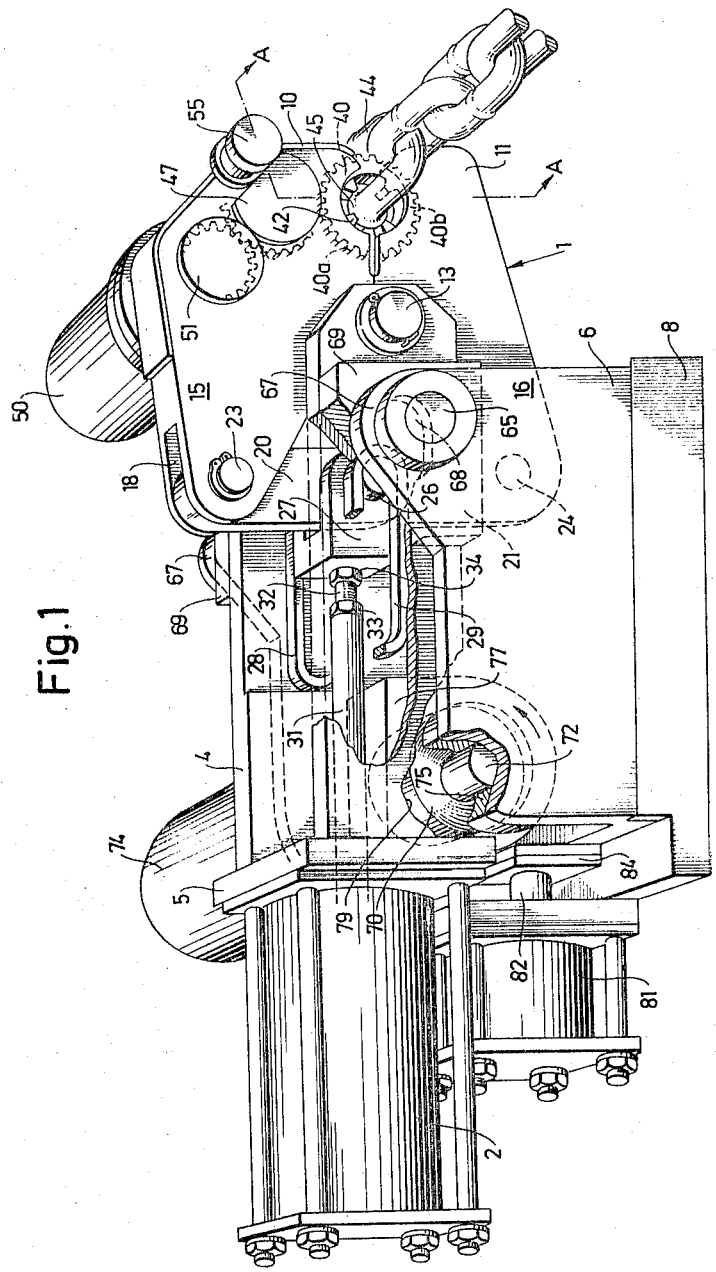
FIG. 1 is a perspective view of an embodiment of the invention comprising an eccentric for the translational movement.

The tool of FIG. 1 comprises a pair of tongs 1 and a hydraulic cylinder 2 for the operation of the tongs, the tongs and the cylinder being supported by a yoke 4, 5 and a cradle 6, in which the yoke is mounted. The yoke comprises two shanks 4 connected by an end plate 5, and the cradle 6 is slidably mounted on a bottom plate 8 in a longitudinal direction.

The tongs 1 consist of two halves each having a jaw portion 10, 11 and a shank portion 15, 16, the two halves being pivotally mounted in the front end of the yoke 4 on a pin 13. The rearwardly extending shank portions 15, 16 of the tongs are provided with recesses 18 at their rear ends, in which recesses arms 20, 21 are pivotally mounted on pins 23 and 24, respectively. The inwardly extending ends of the arms 20, 21 are pivotally mounted on a common pin 26, which in its turn is attached to a U-shaped element 27 straddlingly embracing the inwardly extending ends of the arms. The pin 26 is guided in horizontal longitudinal guide rails 28, 29 which are attached to the inward surfaces of the shanks of the yoke.

The cylinder 2 which is attached to the end plate 5 of the yoke has a piston with a piston rod 31 provided with a threaded stud 32 at its front end. Said stud 32 is provided with threads at one end thereof to be threadedly received in the piston rod 31 and at the other end to be threadedly received in the U-shaped element 27. The threads at the one end may be of opposite direction to those at the other end whereby the effective length of the stud 32 is adjustable even if none of the parts connected by the stud is rotatable. The position is fixed by locking nuts 33, 34.

Figure 2:
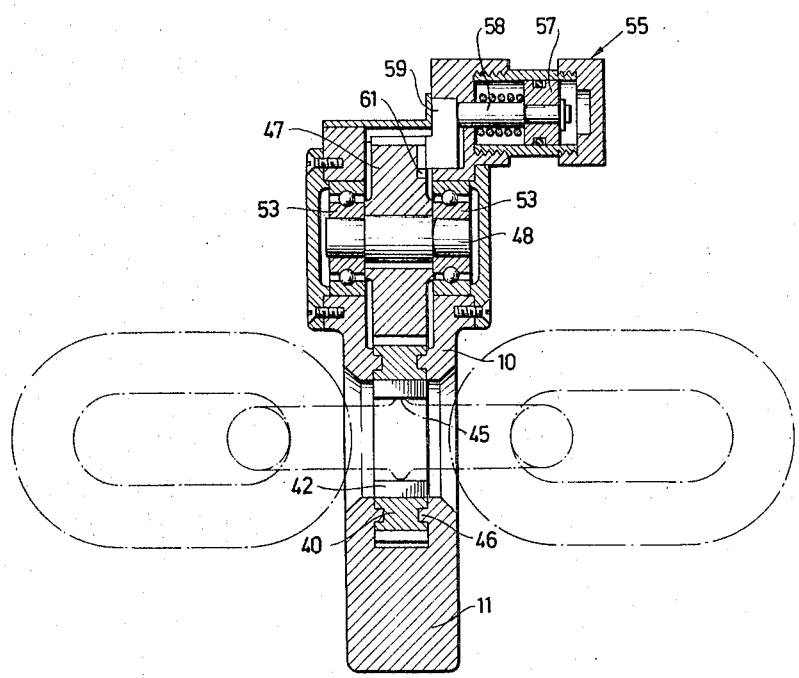
FIG. 2 shows a section taken along the line A—A in FIG. 1.

An external ring gear 40 is rotatably mounted between and inside the jaw members 10, 11 of the tongs and is provided with cutters 42 about its inner periphery. The gear 40 is composed of two similar halves 40a, 40b, which in operation enclose a workpiece, in the present case one of the shanks of a chain link 44. The wheel halves 40a, 40b with the cutters are mounted in the jaw members of the tongs by means of sliding bearings 46 (FIG. 2). A driving motor 50 is attached to the jaw member 10 and has a gear 51 attached to its output shaft, and which is drivingly connected to the gear 40 by the intermediate idling gear 47. The motor 50 may be a hydraulic, pneumatic or electric motor. The shaft 48 of the idling gear 47 is mounted in the jaw member 10 by ball bearings 53 (FIG. 2).

A pneumatic cylinder 55 is mounted on the jaw member 10 outside of the idling gear 47 and has for a purpose to lock the gear 40 in its openable position after a completed working operation. The cylinder 55 comprises a piston 57 slidably mounted in the cylinder and a piston rod 58 attached to the piston 57 and supporting a latch member 59 at its outer end. The latch member 59 is adapted to be received in a recess 61 in the idling gear 47 for preventing further rotational movement thereof. The insertion of the latching member 59 into the recess 61 is effected by pressurized air supplied to the cylinder 55 in the chamber to the right of the piston in FIG. 2 and retraction of the latch member is effected by supplying pressurized air into the chamber on the opposite side of the piston.

The recess 61 is so positioned as to lock the gear wheel 40 in its openable position, i.e. with each of the halves thereof positioned in each one of the jaw portions. For this purpose the idling gear 47 has the same diameter as that of the gear 40.

The yoke 4, 5 with the tongs 1 and the cylinder 2 are supported in the cradle 6 by pins 65, which are attached to upwardly directed extensions 67 at the front end of the cradle 6. The pins 65 are received in oblong holes 68 in blocks 69, which are attached by welding to the front ends of the arms of the yoke 4. With this arrangement the yoke 4, 5 is pivotal about the pins 65 and at the same time reversibly displaceable in the longitudinal direction of the cradle.

A block 77 is attached to the inner side of the end plate 5 below the piston bar 31, said block being provided with a lateral hole 79. An eccentric disc 70 is rotatably mounted with a minimum of clearance in this hole 79 and is eccentrically mounted on the shaft 72, which is rotatably mounted in bearing blocks 75 attached to the inner side of the side walls of the cradle 6. The shaft 72 and the eccentric disc are driven at a low speed by means of a driving motor 74. The yoke 4 is thus at its rear end supported by the eccentric disc 70 and at its front end by the pins 65.

The cradle 6 with the yoke 4 is mounted for sliding movement in its longitudinal direction (perpendicular to the workpiece 44) on the bottom plate 8, and this movement is done by means of a hydraulic cylinder 81 attached to the bottom plate 8 and having a piston rod 82, which acts on a plate 84 attached to the cradle.

In removing the burr formed in butt welding chain links the tool operates in the following way:

With the center axis of the eccentric disc 70 in its foremost position (farthest to the right as seen in FIG. 1) and the tongs 1 in their open position, the tool receives the workpiece, the chain link 44, which is indexed one step for bringing a welding burr 45 in position within the jaws of the tongs. The jaws are then closed by moving the piston bar 31 in forward direction (to the right as seen in FIG. 1) until the pin 26 has moved a small distance beyond a straight line between the pins 23, 24, this causing the tongs to be locked in a closed position. The workpiece is clamped in a holding device (not shown) of any conventional design in such a position that the rotary center of the cutters 42 is substantially concentric with the axis of the chain shank (at 45). The cutter holder 40 is rotated by the action of motor 50, and the cradle 6 is then moved forwardly by means of the cylinder 81, until the cutters have chipped off the burr 45 on the inward side of the link 44 down to the level of the surrounding material of the link, when the cradle 6 has reached its foremost position at which it is locked (by means not shown). The motor 74 is now actuated, and by its rotation the eccentric disc 70 imparts such a movement to the pair of tongs, that the contact area between the rotating cutters and the periphery of the link shank as finished travels around said shank. After the removal of the burr the gear 40 is locked in openable position by actuating the cylinder 55, by which the latch member 59 is brought into engagement with the recess 61, so as to enable the jaw portions to be opened for next indexing of the chain. The actuating means of the cylinder 55 is so connected to the power input of the motor 50 that the power supply to the motor is cut off before the cylinder 55 is actuated for locking the gear 40 in its openable position.

Another embodiment of a tool according to the invention is shown in FIG. 3, differing from that shown in FIGS. 1 and 2 and described above mainly in the means for providing the translational movement of the cutter holder. The rest of the active parts of the tool may be substantially equal to those of the tool of FIG. 1, namely the tongs 1, the yoke 4, and the cylinder 2 and all other elements attached thereto, such as the motor 50, the gear 40 with the cutters 42 etc.

The yoke 4, carrying the tongs 1 at its one end and the cylinder 2 at its other end, is attached to a vertically extending sliding block 100 by means of a mounting block 102. The sliding block 100 is vertically displaceable in a guiding column 104, which is, in turn, attached to a vertical column 106. The vertical movement of the sliding block 100 and thus of the active parts of the tool is effected by a hydraulic cylinder 108, which is attached to the vertical column 106 by means of an angled holder 110, and the piston rod 112 of which is attached to the upper end of the sliding block 100.

The vertical column 106 is mounted on a horizontal sliding plate 114, which is supported in guiding supports 116 (only one of which being shown in FIG. 3) resting on a working table or the like 118. The sliding plate 114 is horizontally movable in the longitudinal direction of the yoke 4 by means of a hydraulic cylinder 120, which is attached to the working table 118 by means of an angle foot 122, and the piston rod 124 of which is attached to the rear side of the vertical column 106.

The tool of FIG. 3 operates in the following way: The workpiece, chain link 44, is brought into position much in the same manner as described in connection with FIG. 1, as by actuation of the cylinder 2 for causing the cutter holder 40 to embrace the link shank to be operated upon. The cutting is carried out by actuating cylinder 120 for moving the column 106 and the sliding plate 114 and thus the entire assembly of active parts of the tool horizontally. When rotated by motor 50 the cutters 42 work on the burr of the link as the tool is moved horizontally in one direction. The movement is reversed when the burr has been cut down to the level of the surrounding link material and the movement of the piston and piston bar 124 of the cylinder 120 in the reversed direction is stopped when the cutters 42 have machined the burr on the opposite side of the shank. Due to the fact that the circle defining the inner positions of the cutter edges is wider than the final diameter of the link shank and during this horizontal movement the tool has been kept in an intermediate vertical position relative to the workpiece, portions of the burr still remain at the top and bottom of the shank. In order also to remove these portions the sliding plate 114 is now brought to an intermediate position by means of the cylinder 120 and the assembly of active parts is now moved vertically by means of the cylinder 108 thereby bringing the cutters 42 to machine the link on its upper and lower sides in a manner similar to that described.

With the tool of FIG. 3 the machining of the burr gives a cross section of the link over the burr, which is not completely circular, some rests of the burr remain in the angles between the vertical and horizontal lines. Such rests may, however, be acceptable in some cases, where the tolerance needed is not too significant. Said rests can be removed almost completely by turning the workpiece 45° and repeating the machining.

In the embodiments described above the workpiece is stationary, i.e. the workpiece is clamped in a stationary holding device, and the cutters are given the required movement, but it will be noted that it is quite possible, as is easily realized by those skilled in the art, that the active parts of the tool with the cutters may be stationary and the workpiece be moved correspondingly.

This may for instance be accomplished in the following way:

With reference to FIG. 3 the active parts of the tool, i.e. the pair of tongs 1 with the cutter holder 40 and the cutters 42 contained therein, the yoke 4, 5, and the cylinder 2 for the operation of said tongs, are loosened from the sliding block 100 and attached to a suitable stationary support, for instance the working table 118 (by means not shown), the yoke being the attached member. In other words the tool is to be operated with the cutter holder 40 rotating in a fixed position.

The rest of the device shown in FIG. 3, i.e. the sliding block 100, the guiding column 104 thereof, the vertical column 106, the hydraulic cylinder 108, and sliding plate 114 with the supports 116 (this part of the device of FIG. 3 is hereinafter called "the translational mover"), is now used as a support for a suitable workpiece holder for giving the chain link to be machined the desired translational movement. The workpiece holder (not shown in the drawing) is thus attached to the sliding plate 100. The workpiece holder can be of any conventional kind, for instance a holder as shown in a pamphlet from Heenan Automatic Machines for the Chain Industry, publication No. 2045, p. 22, FIG. 13. The translational mover with the attached workpiece holder is placed oppositely to the tongs 1 and attached to a stationary support, suitably the same as that of the active parts of the tool, for holding the workpiece in a desired position relative to the cutter holder 42.

The arrangement thus established operates in the following way:

The workpiece, chain link 44, is brought into position by actuation of the cylinder 120 for pushing the plate 114 and thus the workpiece holder with the link forwardly so as to bring the forward shank of said link into position in the cutter holder 40 in the open position thereof. The cutter holder is then closed by actuation of cylinder 2 and rotated by starting the motor 50. The removing of the burr of the chain link is now carried out in the same manner as previously described in connection with FIG. 3, i.e. by moving the workpiece within the rotating cutters 42 horizontally by actuation of cylinder 120 and vertically by actuation of cylinder 108, thus removing the burr on four sides of the link shank.

A corresponding arrangement in connection with the device of FIG. 1 may be done in the following way: As previously described in connection with FIG. 3 the active parts of the tool are attached to a stationary but in this case longitudinally displaceable support, for instance the cradle 6 of FIG. 1. The eccentric means of FIG. 1, i.e. the motor 74 with the shaft 72, the eccentric disc mounted thereon, the block 77 together with the yoke 4, 5 are used for imparting a circular movement to the workpiece, which is effected by attaching the workpiece holder to the front end of the yoke 4, 5 and placing the whole workpiece holder assembly in front of the tongs with the cutter holder. The cutters are brought into position around the workpiece by actuation of cylinder 81 and pushing the tool forwardly with the cutter holder in its open position, and the cylinder 2 is actuated for closing the cutter holder around the workpiece. By actuation of the motor 74 the workpiece is then given a circular movement relative to the rotating cutters 42, for removing the burr from the workpiece, i.e., the chain link.

While the foregoing specification sets forth the invention in specific embodiments thereof, it is to be understood that numerous changes in the design of the tool of the invention may be made without departing from the spirit and scope of the invention as claimed hereinafter.

What I claim is:

1. Tool for external machining of workpieces, comprising a workpiece holder for fixing the workpiece therein, an annular cutter holder adapted to embrace said workpiece, fixed cutters extending inwardly from said cutter holder, driving means for rotating said cutter holder about its annular axis, and means for translationally moving one of said holders perpendicularly to the annular axis of said cutter holder relative to the other of said holders to feed and retract said cutters relative to the workpiece.

2. Tool for external machining of workpieces, comprising a workpiece holder for fixing the workpiece therein, an annular cutter holder adapted to embrace said workpiece, cutters extending inwardly from said cutter holder, driving means for rotating said cutter holder about its annular axis, and means for translationally moving one of said holders perpendicularly to the annular axis of said cutter holder relative to the other of said holders, said annular cutter holder being composed of at least two arc sections so as to be openable for insertion and removal of the workpiece.

3. Tool according to claim 2, comprising a tool holder, said cutter holder being rotatably mounted in said tool holder, which is correspondingly openable.

4. Tool according to claim 3, in which said annular cutter holder is mounted in sliding bearings in said tool holder.

5. Tool according to claim 1, in which said annular cutter holder is an external ring gear.

6. Tool according to claim 2, comprising locking means for preventing rotational displacement of said annular cutter holder in a desired openable position thereof.

7. Tool according to claim 3, comprising locking means for preventing rotational displacement of said annular cutter holder when the latter is in an openable position coincident with the openable position of said tool holder.

8. Tool according to claim 6, comprising driving members mechanically associated with said annular cutter holder, and including an idling gear between said annular cutter holder and said driving means, at least one of said cutter holder and said driving members having a recess formed therein, and a latch member cooperating with said recess.

9. Tool for external machining of workpieces, comprising a workpiece holder for fixing the workpiece therein, an annular cutter holder adapted to embrace said workpiece, cutters extending inwardly from said cutter holder, driving means for rotating said cutter holder about its annular axis, and means for translationally moving one of said holders perpendicular to the annular axis of said cutter holder relative to the other of said holders, said tool holder comprising a pair of tongs, said annular cutter holder being mounted in the tongs.

10. Tool according to claim 1, comprising means for displacing the axis of said annular cutter holder relative to the workpiece.

11. Tool according to claim 10, comprising displacement means arranged to displace said axis substantially rectilinearly in two directions forming an angle to each other.

12. Tool according to claim 11, in which said angle is a right angle.

13. Tool for external machining of workpieces, comprising a workpiece holder for fixing the workpiece therein, an annular cutter holder adapted to embrace said workpiece, cutters extending inwardly from said cutter holder, driving means for rotating said cutter holder about its annular axis, means for translationally moving one of said holders perpendicular to the annular axis of said cutter holder relative to the other of said holders, a tool holder, said annular cutter holder being rotatably mounted in said tool holder, and a rotatable eccentric engaged with said tool holder and operable to impart a circular movement to the axis of said annular cutter holder relative to the workpiece.

References Cited by the Examiner

UNITED STATES PATENTS 3,146,646   9/1964   Mucklenbeck et al. _____ 82—14

WILLIAM W. DYER, Jr., *Primary Examiner.*

GERALD A. DOST, *Assistant Examiner.*